(12) United States Patent
Jones (10) Patent No.: US 7,740,562 B2
(45) Date of Patent: Jun. 22, 2010

(54) EXERCISE EQUIPMENT APPARATUS AND METHOD OF USE IN TRACTOR-TRAILERS WITH SLEEPERS

(76) Inventor: Levi Jones, 350 Preston Pl., Altanta, GA (US) 30332

( * ) Notice: Subject to any disclaimer, the term of this patent is extended or adjusted under 35 U.S.C. 154(b) by 0 days.

(21) Appl. No.: 11/800,944

(22) Filed: May 8, 2007

(65) Prior Publication Data
US 2008/0280732 A1 Nov. 13, 2008

(51) Int. Cl.
A63B 22/00 (2006.01)
A63B 23/00 (2006.01)
A63B 71/00 (2006.01)

(52) U.S. Cl. .......................... 482/51; 482/148

(58) Field of Classification Search .............. 296/24.33, 296/24.38, 24.4, 37.6, 56, 107.08, 190.02; D12/93, 94; 482/52, 148, 904, 1, 4, 51, 54, 482/57, 910; A63B 22/00, 23/00, 71/00
See application file for complete search history.

(56) References Cited

U.S. PATENT DOCUMENTS

| | | | | |
|---|---|---|---|---|
| 4,066,257 A * | 1/1978 | Moller | | 482/54 |
| 4,679,787 A * | 7/1987 | Guilbault | | 482/54 |
| 5,021,776 A * | 6/1991 | Anderson et al. | | 340/5.22 |
| 5,667,461 A * | 9/1997 | Hall | | 482/69 |
| 5,683,332 A * | 11/1997 | Watterson et al. | | 482/54 |
| 5,743,833 A * | 4/1998 | Watterson et al. | | 482/54 |
| 5,813,947 A * | 9/1998 | Densmore | | 482/51 |
| 6,210,306 B1 * | 4/2001 | Miller | | 482/54 |
| 6,224,516 B1 * | 5/2001 | Disch | | 482/54 |
| 6,508,744 B1 * | 1/2003 | Carolus | | 482/54 |
| 6,520,890 B2 * | 2/2003 | Hsu | | 482/54 |
| 6,746,371 B1 * | 6/2004 | Brown et al. | | 482/8 |
| 6,808,475 B2 * | 10/2004 | Kehrbaum | | 482/54 |
| 7,022,050 B2 * | 4/2006 | Sankrithi | | 482/54 |
| 7,052,441 B2 * | 5/2006 | Sankrithi | | 482/54 |
| 7,070,539 B2 * | 7/2006 | Brown et al. | | 482/8 |
| 7,128,693 B2 * | 10/2006 | Brown et al. | | 482/8 |
| 2006/0040798 A1 * | 2/2006 | Weier et al. | | 482/54 |

OTHER PUBLICATIONS

International Search Report mailed Sep. 29, 2008 in PCT/US08/60438, 11 pgs.

* cited by examiner

*Primary Examiner*—Loan H Thanh
*Assistant Examiner*—Oren Ginsberg
(74) *Attorney, Agent, or Firm*—Merchant & Gould P.C.

(57) ABSTRACT

Apparatus and method of factory or post-manufacture installation of at least two exercise equipment units in tractor-trailer vehicles with sleepers. The exercise equipment units are stored initially in storage compartments located under beds behind the driver and passenger seats. The exercise equipment units are securely held within the storage compartments by storage locking mechanisms. Each exercise equipment unit is movable manually or electronically from the storage compartment to an operational or use position within the tractor-trailer walking space or sleeping area. In the operational position, the selected exercise equipment unit is secured by an operation locking mechanism in the operational position; adjusted and setup for use by multiple users. The exercise equipment units are connected to a computer for sensing, remote monitoring and displaying of vital signs of at least two users. The selected exercise equipment unit may be returned manually or electronically to either the first or said second storage compartment and re-secured in the storage compartment.

14 Claims, 10 Drawing Sheets

FIG. 7

EXERCISE EQUIPMENT APPARATUS AND METHOD OF USE IN TRACTOR-TRAILERS WITH SLEEPERS

FIELD OF THE INVENTION

This invention relates to exercise equipment apparatus and method for use in a vehicle, and more particularly to multiple component exercise equipment including cycle or bicycle, treadmill or tread climber and stair climber type exercise equipment apparatus and method of use thereof within trucks with sleepers.

BACKGROUND OF THE INVENTION

For good economic considerations, it is important to have transportation systems that work well. Today, most products are delivered by truck. Truck drivers deliver goods from the producers of goods to the person who buys the products. Heavy truck drivers operate gasoline and diesel powered tractor-trailers that weigh from 600 pounds up to 20,000 pounds per axle. In the case of some tractor-trailers, the equipment can be no more than 75 feet long. Drivers of tractor-trailer vehicles with sleepers may work for common carrier companies that deliver goods to the general public. Tractor-trailer drivers may work for contract carrier companies that delivery of goods for a specific group of shippers, or they work for private carrier firms and some individuals that drive their own tractor-trailer vehicles.

Long distance drivers spend many hours driving behind the wheel of a truck, mostly at night. Many drivers of tractor-trailer vehicles with sleepers sometime spend as much as 100 or more hours straight on the road. It is recognized that truck drivers are responsible for driving big, expensive trucks and adhere to schedules that make for timely delivery of their cargo. To meet these demands, drivers frequently work the most number of hours that are allowed by state laws and federal regulations. Many of the trips keep drivers away from home several days at a time. Improvements have been made on the trucks so that truck drivers can drive safely and smart. There have been many changes made in vehicle such as seating, circulation of fresh air and equipment for seeing, to make for safer driving conditions.

However, vibration, noise, poor weather conditions and the need to stay sharp and alert in heavy traffic or on long stretches of isolated roads can still cause physical and mental stress for the driver. While truck divers who drive in the local area work more regular hours than long distance drivers, they sometimes work overtime. They are also faced with stop-and-go local traffic, and the risk of safely driving such big trucks through narrow streets and alleys and backing into loading docks.

Because of tight schedules and other demands, the drivers do not have ample opportunity to exercise their bodies and as a result are at risk for developing many health problems. The prevalence of working factors that may adversely affect health of truck drivers include irregular shift work, working environment, working posture, handling heavy materials, job stress due to overloading and long working time and limited time off. Consequently, it can be expected that there is significant potential for development of minor health conditions (ringing in the ears, neck pain and low back pain) and significant health illnesses among truck drivers such as hypertension, ulcers in the digestive tract, back injuries, whiplash injuries and hemorrhoids.

In order to cope with the health problems poised to truck drivers, it is an object of this invention to provide apparatus and methods for reducing job stress and improving the working conditions and working environment for truck drivers as described above.

THE INVENTION

According to the present invention, the foregoing and other objects and advantages are attained by the delineation of a design and system for installation of a variety of exercise components for setup and use within the interior of a tractor-trailer cab. Basic selections of multiple kinds of exercise equipment or components for the exercise system can be provided for installation during original truck manufacture or post-manufacture installation.

In accordance with an embodiment of the invention, components that comprise the exercise system include a cycle or bicycle, a treadmill, a tread climber, and a stair climber. Depending upon individual preferences, exercise equipment other than that of a cycle or bicycle, a treadmill, a tread climber, a stair climber may be selected and included with, or replace one or more of these four kinds of exercise equipment in the system. The installation strategies may be dictated by whether included as optional components during initial manufacture of the tractor-trailer or installed as post-manufacture components.

Installation of the cycle or bicycle, treadmill, tread climber, and stair climber exercise equipment units may take place during the initial construction and manufacture of the tractor-trailer vehicle. In according with another alternative embodiment of the invention, the cycle or bicycle, treadmill, tread climber, and stair climber exercise equipment units may be installed in the tractor-trailers post-manufacture and already in use. When the cycle or bicycle, treadmill or tread climber, and stair climber exercise equipment units are in their stored positions, a storage locking mechanism maintains the exercise equipment units in a locked and fixed position. The user of the exercise equipment units may cause the exercise equipment units to be released from the storage locking mechanism and moved manually or electronically from their stored positions to a fixed operating position. When in the operating position, an operation locking mechanism maintains the exercise equipment unit in a locked and fixed position. In one aspect of the invention, installation of the exercise equipment units is made during initial manufacture, installed under either a first bed or second bed, and secured in place by the storage locking mechanism. For operation, the exercise equipment unit is moved manually or electronically by the user in a swinging motion from the normal stored position to an operational or use position and secured by the operation locking mechanism. Upon completion of an exercise routine, the unit may be returned from the operational position to the stored position manually or electronically by the user and secured by the storage locking mechanism.

According to an alternative embodiment of the invention, a cycle or bicycle, treadmill or tread climber, and stair climber exercise equipment units may be installed in tractor-trailers post-manufacture and already in use. The basic configuration for this aspect of the invention is for design and construction of a rack that will hold each unit in place by a storage locking mechanism even if there is a roll over or head-on collision or any type of accident. In general, the particular rack design takes on and may follow the shape of the inside roof area of the tractor-trailer vehicle sleeping area. The foregoing described exercise equipment units are movable from a storage position to an operation position by a user, secured by a locking mechanism and upon completion, returned to the stored position and secured by a locking mechanism in the manner previously described for initial manufacture installation.

Still other objects of the present invention will become more readily apparent to those skilled in this art from the following description wherein there are shown and described preferred embodiments of this invention, simply by way of illustrations of one of the best modes suited to carry out the invention. As it will be realized, the invention is capable of other different embodiments, and its several details are capable of modifications in various, obvious aspects, all without departing from the invention. Accordingly, the drawings and descriptions will be regarded as illustrative in nature and not as restrictive.

BRIEF DESCRIPTION OF THE DRAWINGS

The accompanying drawings are incorporated in and form a part of the specification. The drawings illustrate several aspects of the present invention, and together with the description serve to explain the principles of the invention. In the drawings.

Reference is now made to details of preferred embodiments of the invention, examples of which are illustrated by the figures in the accompanying drawings.

DETAILED DESCRIPTION OF THE INVENTION

Figure 1:
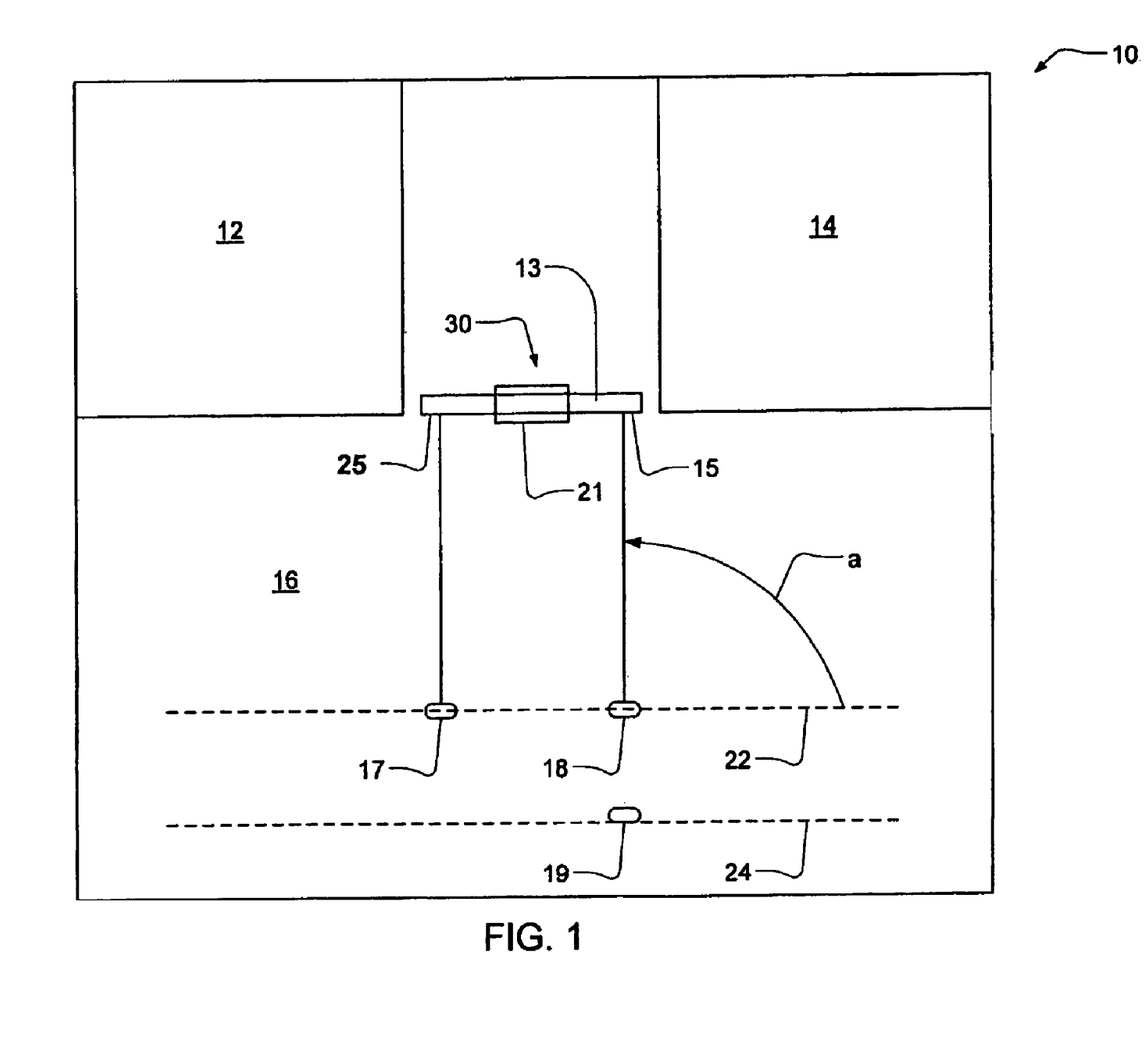
FIG. 1 is a top view of the diagram of the first embodiment of the invention showing a stair climber unit secured in the operational position within a tractor-trailer cab in accordance with the present invention.

Reference is now made to FIG. 1 of the drawings showing a first embodiment of the invention. This aspect of the invention illustrates in a schematic diagram of a tractor-trailer cab 10, with a cycle or bicycle, treadmill or tread climber, or stair climber exercise equipment unit installed within the interior of the tractor-trailer cab 10. In this first embodiment, installation of the exercise equipment unit within the tractor-trailer cab 10, may occur during the initial construction and manufacture of the tractor-trailer 10.

Depending upon particular preferences, either the a cycle or bicycle, treadmill or tread climber, stair climber or other exercise equipment unit, for example, may be initially installed and secured in a compartment under a lower or bottom first bed 22, located in the area behind the driver seat 12 and passenger seat 14 nearest the floor designated generally as the sleeping area 16. Alternatively, as exemplified in FIG. 1, the particular exercise equipment unit may be initially installed and stored in a compartment under a higher or top second bed 24 located above the first bed 22 in the walking space or sleeping area 16 behind driver and passenger seats 12 and 14. As further seen in FIG. 1, the exercise equipment unit may be initially installed in a compartment under the first bottom bed 22 and maintained in a locked or secured position by a storage locking mechanism 18. Alternatively, the treadmill or tread climber or cycle or bicycle exercise equipment unit may also be initially installed in a compartment under a second top bed 24 and maintained in a locked or secured position by storage locking mechanism 19. The compartments under beds 22 and 24 may be used to house two different units, e.g., the cycle or bicycle unit and treadmill or tread climber unit.

Figure 1A:
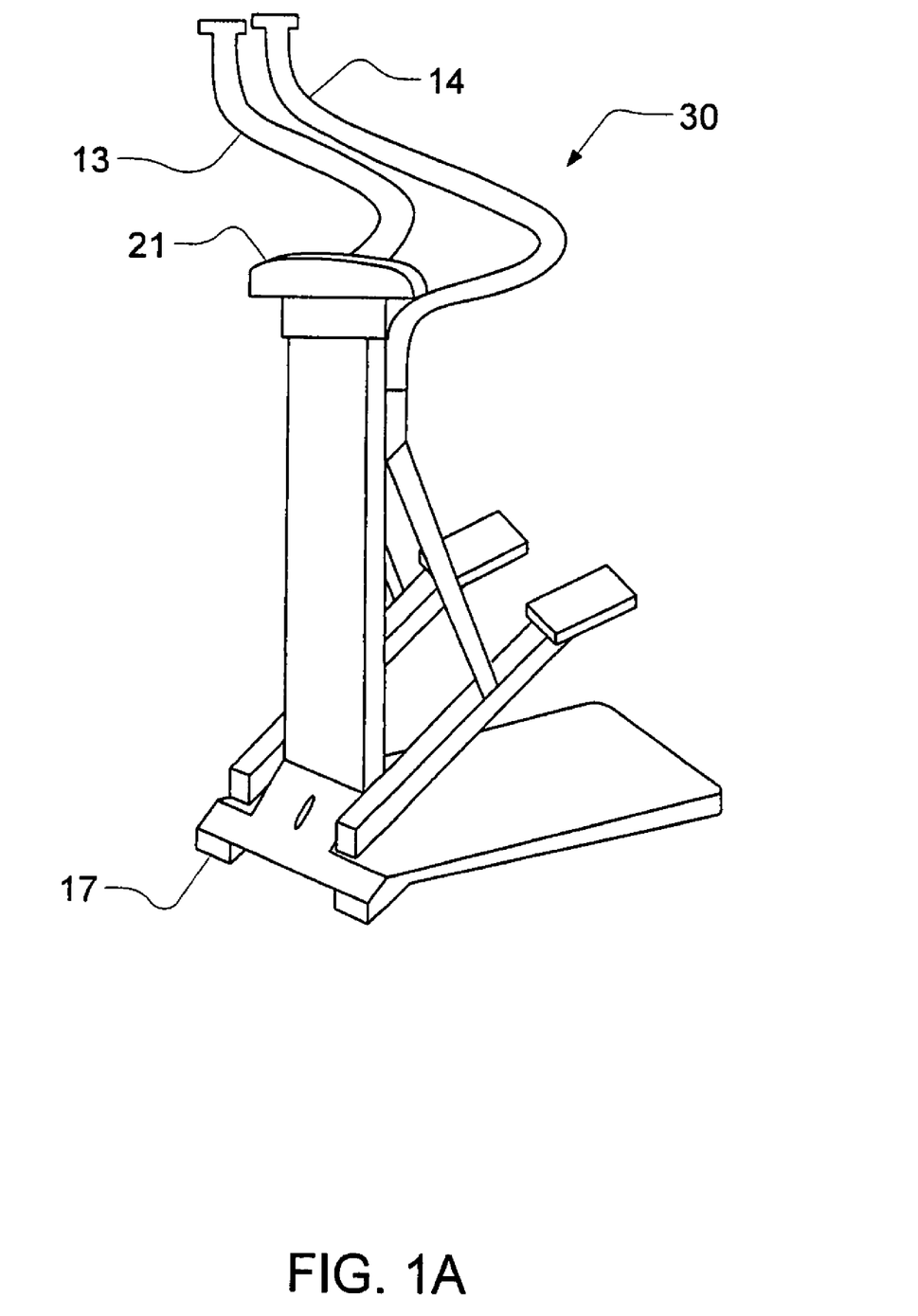
FIG. 1A is a perspective view of the stair climber unit.

Referring to FIG. 1 and FIG. 1A, the stair climber exercise equipment unit 30, initially stored in the compartment under the first bed 22, may be released and caused to be moved by a user in a swinging motion from the compartment, counter-clockwise in the direction of the arrow a, to an operational or use position in sleeping area 16. When the stair climber exercise equipment unit 30 is in the operational or use position, the storage locking mechanism 18 and operation locking mechanism 17 secure the stair climber unit 30 in a fixed secure condition. Additionally, upon completion of an exercise routine, the stair climber exercise equipment unit 30 may be returned from the operational position to the compartment under the first bed 22 manually or electronically by the user and re-secured by storage locking mechanism 18. It is optional that the stair climber unit 30 be initially stored in the compartment under the second bed 24 and maintained in a locked or secured position by storage locking mechanism 19.

In a similar manner described previously, stair climber exercise equipment unit 30 may be released and moved or caused to be moved by a user in a swinging motion counter-clockwise from the normal stored position in the compartment under the top second bed 24 in the direction of the arrow a. The stair climber exercise equipment unit 30 may then be adjusted by the user and set to an operational or use position in the walking space or sleeping area 16. While in the operational or use position, the storage locking mechanism 19 and operation locking mechanism 17 secure the unit in a fixed secure position. Upon completion of a routine, the stair climber exercise equipment unit 30 may be released and moved manually or electronically by the user to the compartment under the top second bed 24 and re-secured by storage locking mechanism 19. The locking mechanisms 17, 18 and 19 features include the structure of stops and grooves. The process of locking the stair climber exercise equipment unit 30 will extend into the cab walking space or sleeping area 16.

Referring still to FIG. 1, the stair climber exercise equipment unit 30 is constructed with an adjustable handlebar 13 having left end grip 25 and right end grip 15. The user of stair climber exercise equipment unit 30 may use end grips 25 and 15 to pull the handlebar 13 up and pushed into a locked position. When the handlebar 13 is in the up, locked position, the user has access to the on and off switch housed within the control-compartment 21 located between the handlebar left end grip 25 and right end grip 15. In addition, the user may grasp handlebar 13, left end grip 25, and right end grip 15 to maintain balance when using the treadmill or tread climber exercise equipment unit 30.

In one preferred embodiment, the stair climber unit 30 may be factory installed or during initial manufacture of the tractor-trailer 10. The stair climber exercise equipment unit 30 may be installed either under the first bottom bed 22 or second top bed 24 and maintained in a fixed locked condition by the storage locking mechanisms 18 and 19 in the manner previously described above.

Still referring to FIG. 1, for operation, the stair climber exercise unit 30 may be moved in a swinging motion from the normal stored position under the first bed 22, to an operational or use position in sleeping area 16 in the similar manner previously described. While in the operational position, the operation locking mechanism 17 cooperates with storage locking mechanisms 18 and 19 to secure the treadmill or tread climber exercise equipment unit in the same manner described previously. The stair climber exercise unit may be 18 to 30 inches in width, between 24 and 40 inches in length, and weigh less than 150 pounds. The end of the stair climber exercise unit 30 that swings out and extends into the cab 10 is the front end of the treadmill or tread climber exercise unit. The control compartment 21 that provides housing for the on-off switch, control instruments, time and distance controls and other features for the stair climber exercise equipment unit 30 may be located about 6 to 8 inches from the end of the front part of the treadmill or tread climber unit. When moved from the normal stored position to an operational or use position, the stair climber exercise equipment unit handlebar end near the beds 22 and 24 must be pulled up and pushed in to a locked position in order to get to the off and on switch. The handlebar can be adjusted up or down depending on the height of the user and fixed by appropriate means to the very front end of the stair climber unit 30 unit so that it will fold from front to rear for storage under the first or second beds.

Whenever the stair climber unit 30 swings out and moved to the operational locked position, the unit will extend into the cab of the truck by about 6 to 18 inches into the space between the driver and passenger seats. The stair climber unit 30 is constructed of material having properties such that continuous use will not damage the truck floor and walking area and is of sufficient strength to adequately support the weight of a user weighing up to about 350 pounds.

The stair climber unit 30 is optimally connected and linked to a computer having a program and system that will allow remote monitoring and display data of vital signs of, e.g., heart rate, pulse of at least two different users. The particular system and apparatus used for obtaining diagnostic information of a stair climber user's body to facilitate remote monitoring and display of the data in the manner described above may comprise a variety of computer systems, devices and techniques. By way of example, reference is made to U.S. Pat. No. 7,128,693 for a "Method for Monitoring Cumulative Fitness Activity;" U.S. Pat. No. 7,070,539 for a "Method for Monitoring Cumulative Fitness Activity;" and U.S. Pat. No. 6,746,371 for "Managing Fitness Activity Across Diverse Exercise Machines Utilizing a Portable Computer System." The disclosures of U.S. Pat. Nos. 7,12,869, 7,070,539 and 6,746,371 are hereby specifically incorporated herein by reference.

Figure 2:
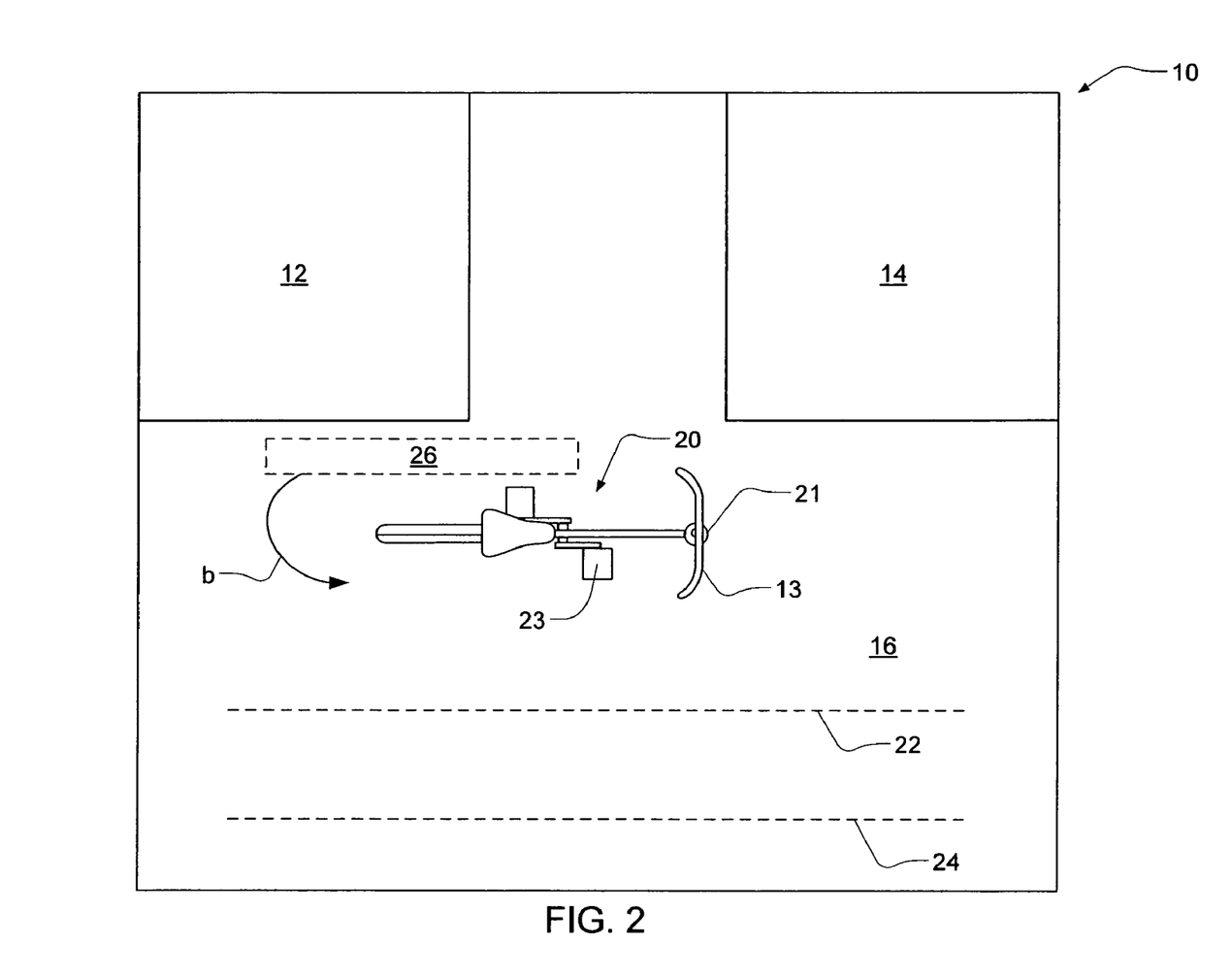
FIG. 2 is a top view of a schematic diagram of the first embodiment of the invention showing a cycle or bicycle unit secured in the operational position within the tractor-trailer cab.
Figure 2A:
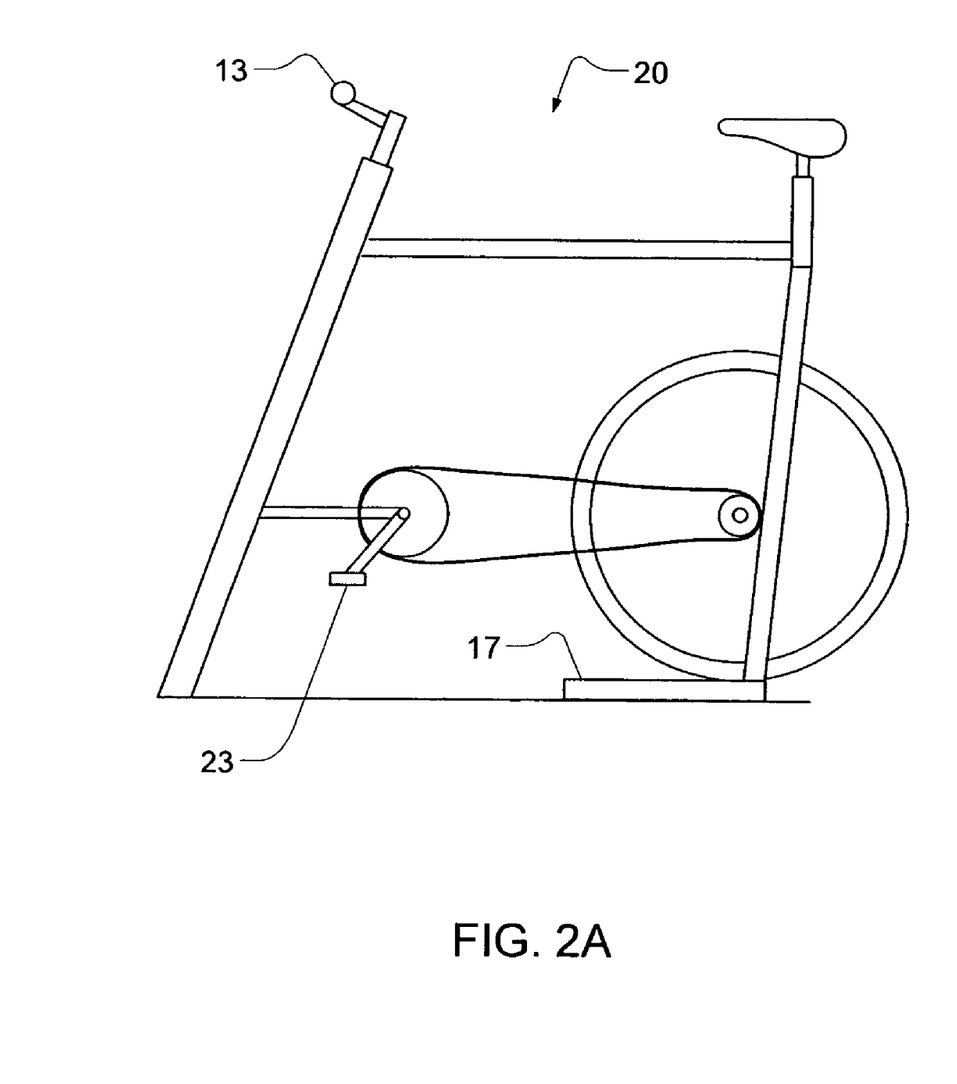
FIG. 2A is a side elevation view of the cycle or bicycle unit.
Figure 3:
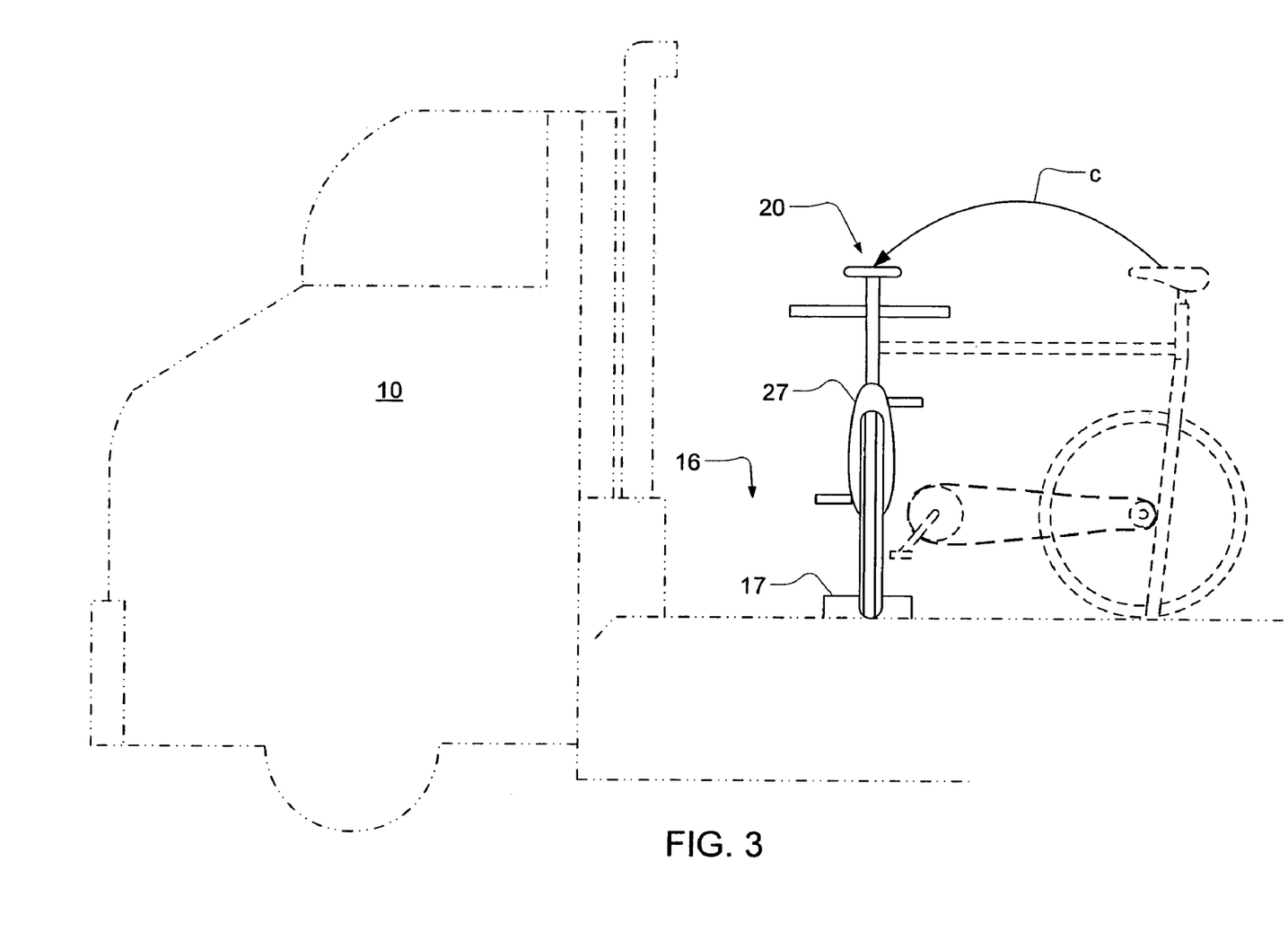
FIG. 3 is a partial cut-away side elevation view similar to FIG. 2 showing a detail of the cycle or bicycle in the operational position within the tractor-trailer cab.

Referring now to FIG. 2, FIG. 2A, and FIG. 3, according to another embodiment, the exercise equipment is a cycle or bicycle unit 20 that is initially installed and secured in closet compartment 26 located behind the driver's seat 12. The cycle or bicycle unit 20 may be moved counterclockwise from the stored position manually by the user in the direction of the arrow c, to the operational position. Whenever the cycle or bicycle exercise equipment unit 20 is in the operational or use position within the sleeping area 16, operation locking mechanism 17 secures the unit in a fixed secure condition. Additionally, the cycle or bicycle unit 20 may be moved counterclockwise in the direction of b electronically in a swinging motion from the normal stored position in the closet compartment 26 to the operational or use position. When the exercise equipment cycle or bicycle unit 20 is in the operational or use position, the cycle or bicycle unit 20 may be set-up, adjusted and held in a locked and fixed-position in the sleeping area 16 by the operation locking mechanism 17. In the operational position, the cycle or bicycle exercise equipment unit 20 will be maintained seated in a locked and fixed position parallel to the first and second beds 22 and 24 in the truck walk space or sleeping area 16.

Referring still to FIGS. 2, 2A and FIG. 3, the handlebar 13 for the cycle or bicycle unit 20 is about 6 inches on each side of the stem and is foldable downward and along the side of the stem when not in the use or operational position in sleeping area 16.

In order to set-up the cycle or bicycle exercise equipment unit 20 for use in the operational position, the handlebar 13 is pulled up by the user and snapped into a locked and fixed position. The cycle or bicycle exercise equipment unit 20 foot pedals 23 normally are in a closed position against the cycle or bicycle frame 27. For operation, a user of the cycle or bicycle exercise equipment unit 20 may push the pedals 23 open with his/her feet.

The cycle or bicycle exercise equipment unit 20 will be connected to a computer input to allow remote monitoring of the vital signs of heart rate, pulse of the user. The computer comprises a program and system adapted to allow remote monitoring and display vital signs of, e.g., heart rate, pulse data for at least two different unit users.

The particular system and apparatus for obtaining diagnostic information of a cycle or bicycle user's body to facilitate remote monitoring and display of the data in the manner described above may comprise a variety of computer systems, devices and techniques. By way of example, reference is made to U.S. Pat. No. 7,128,693 for a "Method for Monitoring Cumulative Fitness Activity;" U.S. Pat. No. 7,070,539 for a "Method for Monitoring Cumulative Fitness Activity;" and U.S. Pat. No. 6,746,371 for "Managing Fitness Activity Across Diverse Exercise Machines Utilizing a Portable Computer System." The time, distance and other data will be displayed on the device on the stem under the handlebars.

The cycle or bicycle exercise equipment unit 20 in position for use will be designed and constructed so that continuous use will not damage the truck floor and walking area and sleeping area 16. The cycle or bicycle exercise equipment unit 20 will be made of sturdy construction, support the weight of a user weighing up to about 350 pounds, may be about 24 inches to about 30 inches in length, and about 6 to about 10 inches wide.

Figure 4:
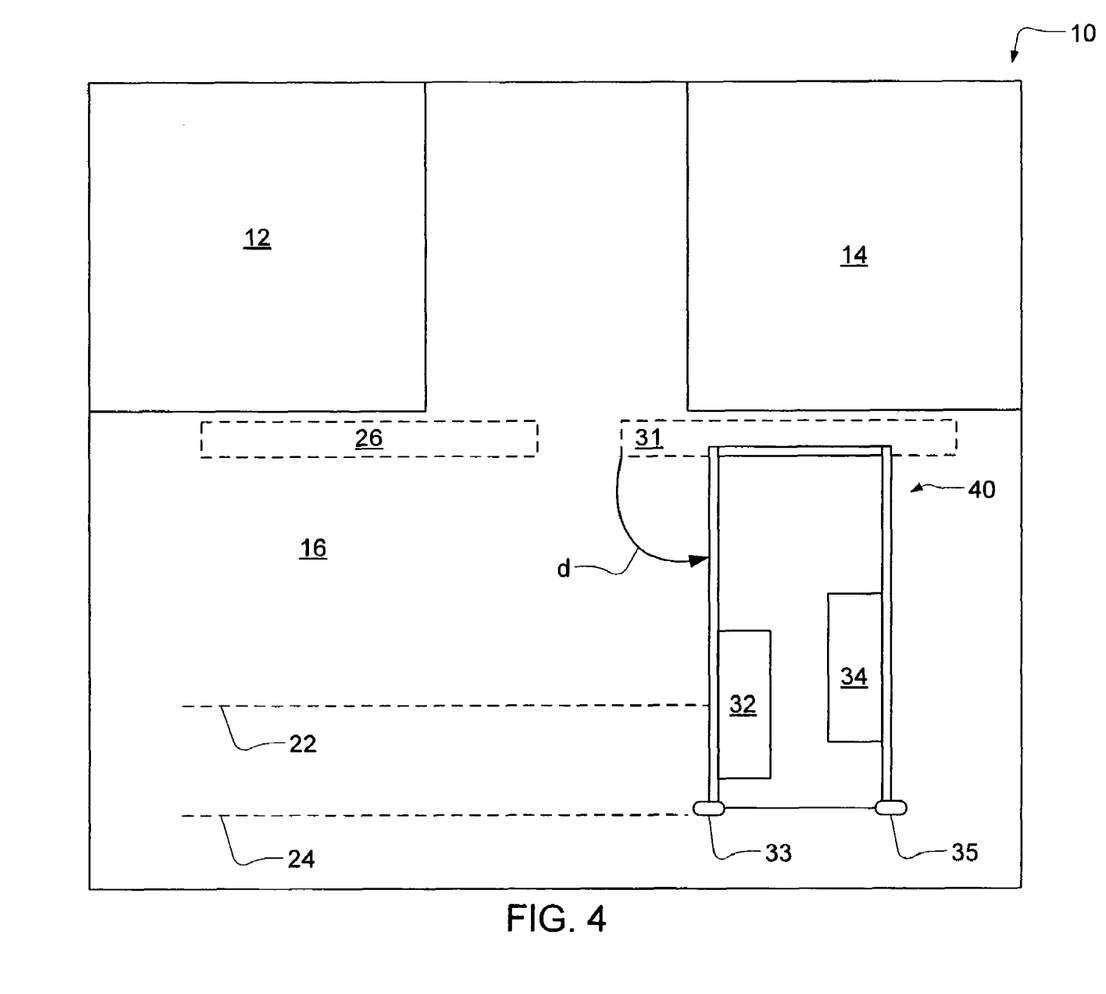
FIG. 4 is a top view of a schematic diagram of a treadmill or tread climber unit locked in the operation position within the tractor-trailer cab.
Figure 4A:
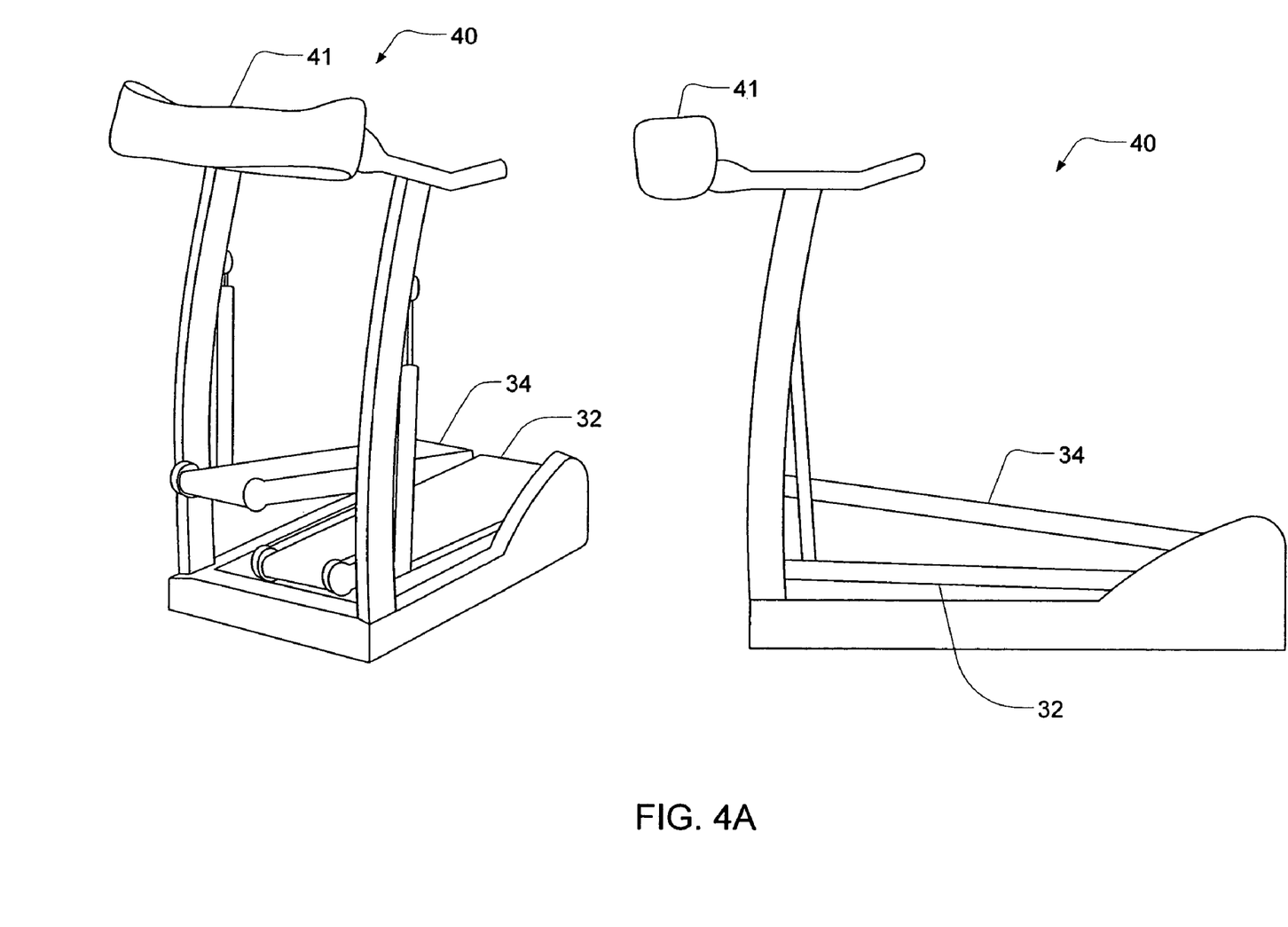
FIG. 4A is a perspective view and a side view showing the treadmill or tread climber locked in the operational position within the tractor-trailer cab.

Referring now to FIGS. 4 and 4A, in another aspect of the invention, the treadmill or tread climber exercise equipment unit 40 is installed initially in the closet or compartment 31 behind the passenger's seat 14. For operation, the treadmill or tread climber unit 40 may be moved counterclockwise in the direction of arrow d manually or electronically in a swinging motion from compartment 31 to an operational position in the walk space or sleeping area 16 behind the driver's seat 13 and the passenger's seat 14.

When the treadmill or tread climber exercise equipment unit 40 is moved from the normal stored position in the closet compartment to an operational or use position, the treadmill or tread climber unit 40 is maintained in a locked and fixed position by the left operation locking mechanism 33 and right operation locking mechanism 35. The left and right operation locking mechanisms 33 and 35 construction may include the structure of stops and groves. The treadmill or tread climber exercise equipment unit 40 will be seated in a locked and fixed position perpendicular to the first bottom bed 22 and second top bed 24 in the truck walk space or sleeping area 16. When in the locked position the stair climber unit left foot pedal 32 and right foot pedal 34 will be ready for use. When using the stair climber exercise equipment unit 40 the user may grasp or hold on to the top of the stair climber for balance.

Referring still to FIGS. 4 and 4A, the treadmill or tread climber exercise equipment unit 40 may be about 48 inches in height from the vehicle floor, about 20 inches in width, and have a weight of less than about 40 pounds. The on-off switch, control instruments, time and distance controls and other features for the treadmill or tread climber unit 40 will be located in the top control-display compartment 41.

The treadmill or tread climber exercise equipment unit 40 will be connected to a computer input to allow remote monitoring of the vital signs of heart rate, pulse of the user. The computer comprises a program and system adapted to allow remote monitoring and display vital signs of, e.g., heart rate, pulse data for at least two different unit users. The particular system and apparatus for obtaining diagnostic information of a treadmill or tread climber user's body to facilitate remote monitoring and display of the data in the manner described above may comprise a variety of computer systems, devices and techniques. By way of example, reference is again made to U.S. Pat. No. 7,128,693 for a "Method for Monitoring Cumulative Fitness Activity;" U.S. Pat. No. 7,070,539 for a "Method for Monitoring Cumulative Fitness Activity;" and U.S. Pat. No. 6,746,371 for "Managing Fitness Activity Across Diverse Exercise Machines Utilizing a Portable Computer System." The time, distance and other data will be displayed on a small panel in control-display compartment 41.

The treadmill or tread climber exercise equipment unit 40 in position for use will be designed and constructed so that continuous use will not damage the truck floor and walking area and sleeping area 16. The treadmill or tread climber exercise equipment unit 40 will be made of sturdy construction and support the weight of a user weighing up to about 350 pounds.

Figure 5:
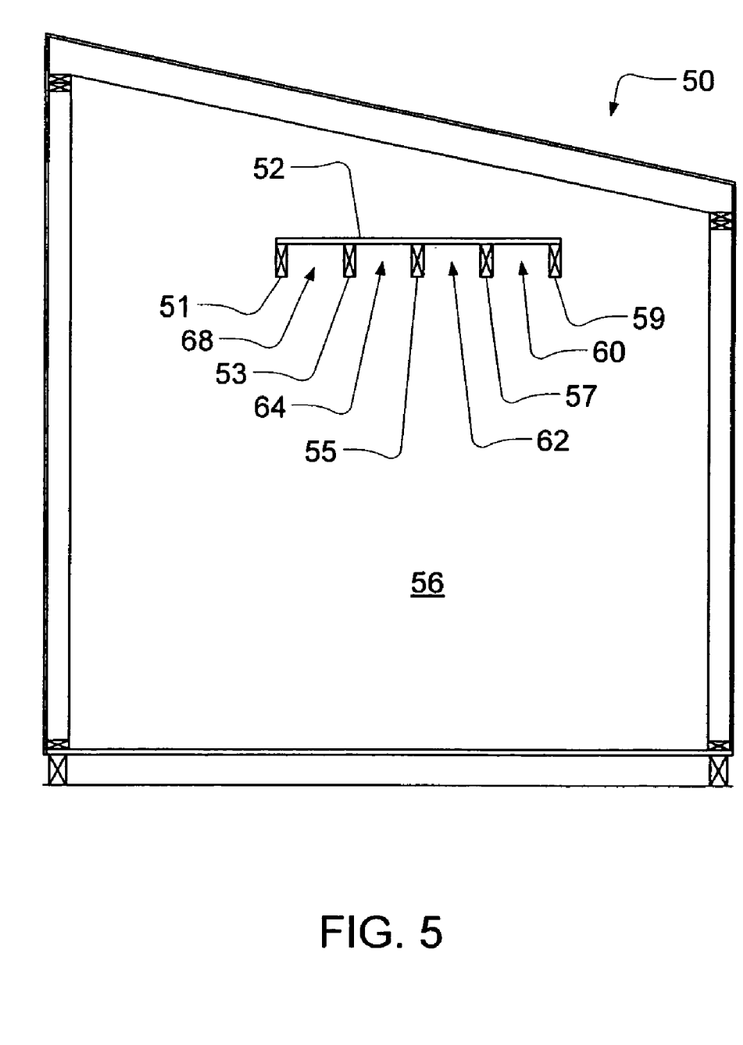
FIG. 5 is a side elevation schematic diagram of a second embodiment of the present invention showing the apparatus for storing and securing the cycle or bicycle, treadmill, tread climber, and stair climber units within the tractor-trailer cab.
Figure 6:
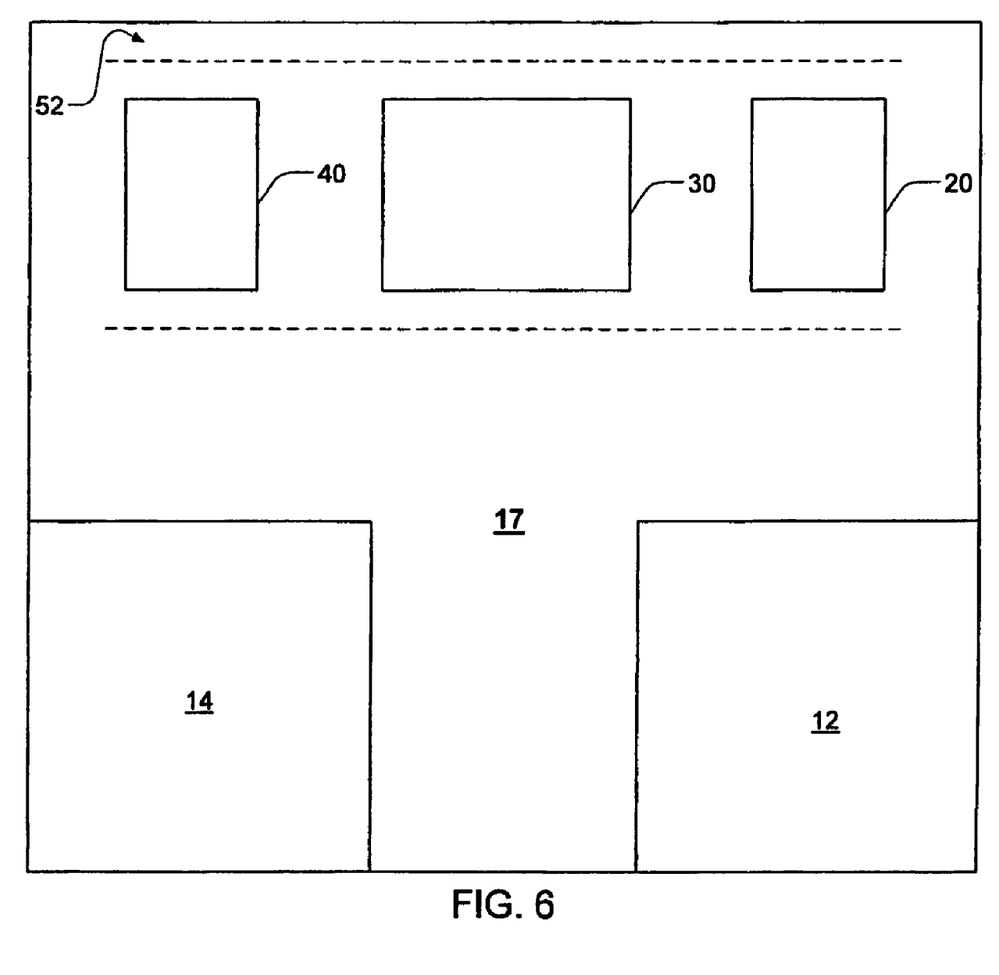
FIG. 6 is a top block diagram of the second embodiment showing a layout of the cycle or bicycle, treadmill, tread climber, and stair climber units arranged in their locked storage positions within the tractor-trailer cab

Referring now to FIG. 5 and FIG. 6, there is disclosed another alternative embodiment of the invention. In this embodiment, the cycle or bicycle unit 20, treadmill or tread climber unit 40 or stair climber 30 exercise equipment units may be installed in tractor-trailers post-manufacture and already in use. The basic post-manufacture configuration is an exercise equipment rack 52 provided with at least three equipment compartment-slots or rack spaces 60, 62, 64 and 68 and which serves as a storage compartment means to hold the cycle or bicycle unit 20, treadmill or tread climber unit 40 and stair climber 30 exercise equipment units. In general, the particular design for rack 52 is for the rack to follow the shape of the inside roof of the tractor-trailer 50 sleeping area 56. The compartment-slots or rack slots 60, 62, 64 and 68 design and construction include equipment guides or retainers 51, 53, 55, 57 and 59 which serve as locking means. The retainers are constructed to maintain each exercise equipment cycle or bicycle unit 20, stair climber 30 or tread climber 40 secured in place even if there is a tractor-trailer roll over or head-on collision or other type of accident.

Referring still to FIG. 5 and FIG. 6, the rack 52 will be affixed and secured to the tractor-trailer 50 roof inside the sleeping area 56, the particular design of which is generally consistent with and follows the interior metal structure of tractor-trailer 50. The rack 52 optimally provides for the release of one exercise unit at a time. Therefore, only one exercise unit will be operational at a particular time. In one example, while in the normal position, the cycle or bicycle exercise equipment unit 20 will be secured in a locked and fixed position in the rack 52 within rack space 60 behind and above the driver's seat 12. While in the rack space, the cycle or bicycle unit 20 is locked in a secured position within rack space 60 by the guides or retainers 57 and 59. For use or operation, the cycle or bicycle exercise equipment unit 20 may be pulled down out of the rack space 60 manually by the user to the operational position in the walk space or sleeping area 56. Additionally, the cycle or bicycle exercise equipment unit 20 may be pulled down out of rack space 60 by the user electronically as a means for moving the cycle or bicycle exercise equipment unit 20 in a swinging motion from the normal stored position in rack space 60 to an operational or use position in the walk space or sleeping area 56. Whenever the cycle or bicycle exercise equipment unit 20 is moved to the operational use position, the unit is held in a locked and fixed position by operational locking mechanism 17, which serves as a means to secure the unit in the operational use position, in a similar manner as previously described. The construction, physical properties, operating characteristics and parameters of the cycle or bicycle exercise equipment unit 20 are the same as previously described for the cycle or bicycle exercise equipment unit.

Referring still to FIGS. 5 and 6, in a second example, the treadmill or tread climber exercise equipment unit 40, is positioned in rack 52 for use in a manner similar to the cycle or bicycle unit 20. While in the normal stored position, treadmill or tread climber unit 40 may be secured in a locked and fixed position in the rack 52 within a middle rack space 62 between the driver's seat 12 and the passenger's seat 14. While in the rack space, the treadmill or tread climber unit 40 is locked in a secured position within rack space 62 by the guides or retainers 55 and 57

Still referring to FIG. 5 and FIG. 6, the treadmill or tread climber 40, alternatively, may be secured in a locked and fixed position in the rack 52 within a middle rack space 64 between the driver's seat 12 and passenger's seat 14. While in the rack space, the treadmill or tread climber unit 40 is locked in a secured position within rack space 64 by the guides or retainers 53 and 55. For use or operation, the treadmill or tread climber exercise equipment unit 40 may be pulled down out of the rack space 62 or rack space 64 manually by the user to the operational position in the walk space or sleeping area 56. Additionally, the treadmill or tread climber exercise equipment unit 40 may be electronically pulled down out of middle rack space 62 or middle rack space 64 by the user in a swinging motion from the normal stored position in rack, space 62 or rack space 64 to an operational or use position in the walk space or sleeping area 56. When the treadmill or tread climber exercise equipment unit 40 is moved to the operational use position, the unit is held in a locked and fixed position by operational the operation locking mechanism 17 in the similar manner previously described. The construction, physical properties, operating characteristics and parameters of the treadmill or tread climber exercise equipment unit 40 are the same as previously described for the treadmill or tread climber exercise equipment unit. The option for post-manufacture installation of the treadmill or tread climber unit 40 may be based upon calculation of tractor-trailer weight limitations.

Referring still to FIGS. 5 and 6, in yet a third example, the stair climber exercise equipment unit 30, is positioned in rack 52 for use in a manner similar to the methods described for the cycle or bicycle 20 and treadmill or tread climber 40. In the normal position, the stair climber exercise equipment unit 30 will be secured in a locked and fixed positioned in the rack 52 within rack space 68 behind and above the passenger's seat 14. When not in use, the stair climber exercise equipment unit 30 is locked in a secured position within rack space 68 by the guides or retainers 51 and 53.

For use or operation, the stair climber exercise equipment unit 30 may be manually pulled down out of the rack space 68 by the user to the operational position in the walk space or sleeping area 56. Additionally, the stair climber exercise equipment unit 30 may be electronically pulled down out of rack space 68 by the user in a swinging motion from the normal stored position in rack space 68 to an operational or use position in the walk space or sleeping area 56. Whenever the stair climber exercise equipment unit 30 is moved to the operational use position, the unit is held in a locked and fixed position by operational locking mechanisms 33 and 35 in the similar manner previously described. The construction, physical properties, operating characteristics and parameters of the stair climber exercise equipment unit 30 are the same as those previously described for the stair climber exercise equipment unit.

Figure 7:
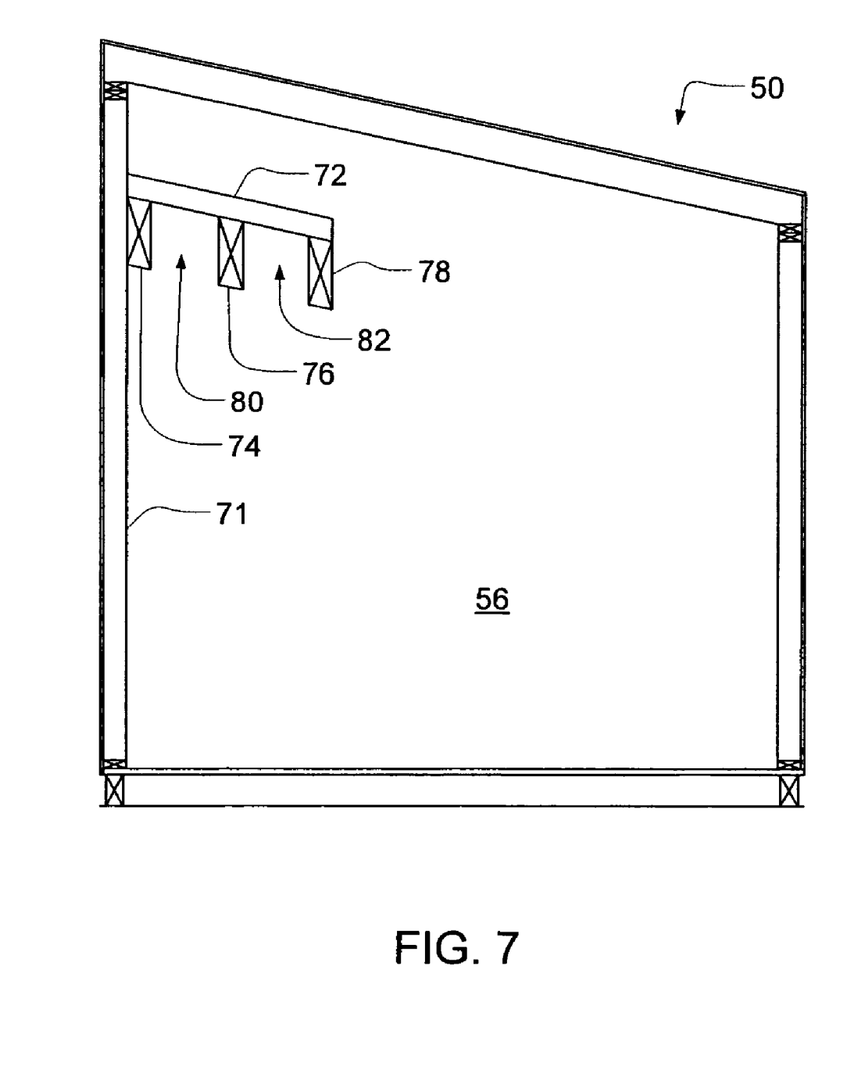
FIG. 7 is a side elevation schematic diagram of a third embodiment showing apparatus for securing the cycle and stair climber units within the tractor-trailer cab.

Referring now to FIG. 7, in yet another post-manufacture embodiment, the wall rack 72 for housing and securing the cycle or bicycle unit 20 and stair climber unit 30 (as shown in FIG. 6) is affixed to the wall 71 of tractor-trailer 50 directly behind the passenger's and driver's seats. The wall rack 72 optimally provides for the release of one of the two exercise units at a time. Therefore, only one exercise unit will be operational at a particular time.

Still referring to FIG. 7, in one example, the cycle or bicycle exercise equipment unit 20 (as shown if FIG. 6) may be secured in a locked and fixed positioned in the wall rack 72 within rack space 80 behind the driver's and passenger's seats. For example, while in the rack space 80, the cycle or bicycle unit 20 may be locked in a secured position within the rack space 80 by guides or retainers 74 and 76.

For use or operation, the cycle or bicycle exercise equipment unit 20 (as shown in FIG. 6) may be pulled out of the rack space 80 manually by the user to the operational position in the walk space or sleeping area 56. Additionally, the cycle or bicycle exercise equipment unit 20 may be pulled out of rack space 80 by the user electronically in a swinging motion from the normal stored position in rack space 80 to an operational or use position in the walk space or sleeping area 56.

Whenever the cycle or bicycle exercise equipment unit 20 (as shown in FIG. 6) is moved to the operational use position, the unit may be held in a locked and fixed position by an operational locking mechanism (such as the operational locking mechanism 17 shown in FIG. 6) in a similar manner as previously described. The construction, physical properties, operating characteristics and parameters of cycle or bicycle exercise equipment unit 20 are also the same as previously described.

Referring still to FIG. 7, in a second example, the stair climber exercise equipment unit 30 (as shown if FIG. 6) may be positioned in the wall rack 72 for use in a manner similar to the cycle or bicycle unit 20 (discussed above). In the normal position, the stair climber exercise equipment unit 30 will be secured in a locked and fixed positioned in the wall rack 72 within rack space 82 behind the passenger's and driver's seats. The stair climber exercise equipment unit 30 is locked in a secured position within the rack space 82 by the guides or retainers 76 and 78. For use or operation, the stair climber exercise equipment unit 30 may be manually pulled out of the rack space 82 by the user to the operational position in the walk space or sleeping area 56. Additionally, the stair climber exercise equipment unit 30 may be electronically pulled out of the rack space 82 by the user in a swinging motion from the normal stored position in the rack space 82 to an operational or use position in the walk space or sleeping area 56. Whenever the stair climber exercise equipment unit 30 is moved to the operational use position, the unit is held in a locked and fixed position by operational locking mechanisms (such as the operational locking mechanisms 33 and 35 shown in FIG. 4) in a similar manner as previously described. The construction, physical properties, operating characteristics and parameters of the stair climber exercise equipment unit 30 are the same as those previously described.

While particular systems and methods of use have been shown and illustrated, it is intended in this specification to include all equivalent systems and equivalent methods which would reasonably occur to those skilled in the art. The invention is further defined by the claims appended herein.

What is claimed is:

1. A tractor-trailer cab comprising:
   a driver's area comprising at least one seat; and
   a sleeping area located behind the driver's area, the sleeping area comprising:
     a floor connecting the sleeping area to the driver's area;
     at least one bed located at a height above the floor which is sufficient to allow at least one exercise equipment unit to be used while at least a portion of the at least one exercise equipment unit is under the at least one bed;
     a storage compartment installed under the at least one bed located at the height above the floor in the sleeping area of the tractor-trailer cab, the storage compartment comprising the at least one exercise equipment unit, wherein the at least one exercise equipment unit is installed as a component of the tractor-trailer cab;
     a storage locking mechanism functionally attached to the at least one bed, wherein said storage locking mechanism:
       engages said at least one exercise equipment unit so as to secure said at least one exercise equipment unit in a fixed position in said storage compartment at the height above the floor; and
       releases said at least one exercise equipment unit from the fixed position at the height above the floor of the sleeping area so that said at least one exercise equipment unit may be moved in a swinging motion from the storage compartment at the height above the floor down to the floor of the sleeping area; and
     an operation locking mechanism functionally attached to the at least one bed, wherein said operation locking mechanism engages said at least one exercise equipment unit, so as to assist in maintaining said at least one exercise equipment unit on the floor of the sleeping area for operation by a user, wherein said operation locking mechanism is assisted by the reengagement of said storage locking mechanism to said at least one exercise equipment unit.

2. The tractor-trailer cab according to claim 1, wherein upon completion of an exercise routine, said operation locking mechanism and said storage locking mechanisms are released and the at least one exercise equipment unit is returned by the user to the storage compartment and re-secured by said storage locking mechanism.

3. The tractor-trailer cab according to claim 1, wherein said at least one exercise equipment unit is electronically released from the storage compartment.

4. The tractor-trailer cab according to claim 3, wherein upon completion of an exercise routine, said at least one exercise equipment unit is electronically returned to the storage compartment and re-secured by said storage locking mechanism.

5. The tractor-trailer cab according to claim 1, wherein said at least one exercise equipment unit comprises one or more of a treadmill, a cycle, a bicycle, a stair climber or a tread climber.

6. A tractor-trailer cab comprising:
storage compartment means for storing at least one exercise equipment unit in at least one storage compartment, wherein the storage compartment means is installed in and secured to an inside roof area of the tractor-trailer cab, the tractor-trailer cab comprising a sleeping area under the inside roof area, and wherein the storage compartment means follows a shape of the inside roof area;
locking means, functionally attached to the storage compartment means, for securing and locking said at least one exercise equipment unit in a stored position in said at least one storage compartment at a height above a floor of the sleeping area, wherein the locking means comprises at least one retainer to lock said at least one equipment unit in the stored position, wherein the at least one retainer is utilized to assist in maintaining said at least one exercise equipment unit in the stored position in the event of a collision or rollover involving the tractor-trailer cab when said locking means is locked, wherein a release of said locking means releases said at least one exercise equipment unit to be pulled down in a swinging motion from the storage compartment means at the height above the floor down to the floor of the sleeping area while keeping said at least one exercise equipment unit secured to the storage compartment means;
operation means functionally attached to the floor of the sleeping area for securing and locking said at least one exercise equipment unit in a fixed operation or use position to the floor of the sleeping area, wherein the means for securing and locking said at least one exercise equipment unit in an operation or use position in the sleeping area operates in cooperation with the released locking means to secure either said at least one exercise equipment unit to both the storage compartment means and to the floor of the sleeping area of the tractor-trailer cab.

7. A method of using exercise equipment in tractor-trailer vehicles with sleepers comprising the steps of:
installing a storage compartment under at least one bed in a sleeping area of a tractor-trailer cab, the storage compartment comprising at least one exercise equipment unit, wherein the at least one exercise equipment unit is installed as a component on the tractor-trailer cab and wherein the at least one bed is located at a height above a floor which is sufficient to allow at least one exercise equipment unit to be used while at least a portion of the at least one exercise equipment unit is under the at least one bed, in a sleeping area located behind a driver's area in the tractor-trailer cab;
locking, using a storage locking mechanism functionally attached to the at least one bed at the height above the floor in the sleeping area of the tractor-trailer cab, the at least one exercise equipment unit in the storage compartment in a stored position in the sleeping area of the tractor-trailer cab, wherein locking the at least one exercise equipment unit in the storage compartment comprises:
engaging the at least one exercise equipment unit so as to secure the at least one exercise equipment unit in a fixed position in the storage compartment at the height above the floor of the sleeping area; and
releasing the at least one exercise equipment unit from the fixed position at the height above the floor of the sleeping area so that at least one exercise equipment unit may be moved from the storage compartment at the height above the floor of the sleeping area down to the floor of the sleeping area; and
securing, using an operation locking mechanism functionally attached to the at least one bed, the at least one equipment unit in an operational or use position in the sleeping area, wherein securing the at least one exercise equipment unit in an operational or use position in the sleeping area comprises engaging the at least one exercise equipment unit so as to assist in maintaining the at least one exercise equipment unit in a fixed and locked position on the floor of the sleeping area for operation by a user, wherein the operation locking mechanism is assisted by the reengagement of said storage locking mechanism to the at least one exercise equipment unit.

8. A method of using exercise equipment in tractor-trailer vehicles with sleepers comprising the steps of:
installing a storage compartment under at least one bed in a sleeping area of a tractor-trailer cab, the storage compartment comprising at least one exercise equipment unit, wherein the at least one exercise equipment unit is installed as a component on the tractor-trailer cab and wherein the at least one bed is located at a height above a floor which is sufficient to allow at least one exercise equipment unit to be used while at least a portion of the at least one exercise equipment unit is under the at least one bed, in a sleeping area located behind a driver's area in the tractor-trailer cab;
locking, using a storage locking mechanism functionally attached to the at least one bed at the height above the floor in the sleeping area of the tractor-trailer cab, the at least one exercise equipment unit in the storage compartment in a stored position in the sleeping area of the tractor-trailer cab, wherein locking the at least one exercise equipment unit in the storage compartment comprises:
engaging the at least one exercise equipment unit so as to secure the at least one exercise equipment unit in a fixed position in the storage compartment at the height above the floor of the sleeping area; and
releasing the at least one exercise equipment unit from the fixed position at the height above the floor of the sleeping area so that at least one exercise equipment unit may be moved from the storage compartment at the height above the floor of the sleeping area down to the floor of the sleeping area; and
securing, using an operation locking mechanism functionally attached to the at least one bed, the at least one equipment unit in an operational or use position in the sleeping area, wherein securing the at least one exercise equipment unit in an operational or use position in the sleeping area comprises engaging the at least one exercise equipment unit so as to assist in maintaining the at least one exercise equipment unit in a fixed and locked position on the floor of the sleeping area for operation by a user, wherein the operation locking mechanism is assisted by the reengagement of said storage locking mechanism to the at least one exercise equipment unit.

9. A method according to claim 8 further comprising the steps of:
- moving said first exercise equipment unit in a swinging motion from within said first storage compartment to the fixed operational or use position in the sleeping area; and
- adjusting and setting said first exercise equipment unit in a position for use by multiple users.

10. A method according to claim 9 further comprising the steps of:
- receiving a connection of said first exercise equipment unit to a computer input;
- detecting, using a computer connected to the computer input, vital signs of multiple users;
- transmitting information of the vital signs to the computer, wherein the computer is located at remote location with respect to the first exercise equipment unit, for remote monitoring; and
- displaying the vital signs of the multiple on the computer.

11. A method according to claim 8 further comprising the steps of:
- moving said second exercise equipment unit in a swinging motion from the from within said second storage compartment to the fixed operational or use position in the sleeping area; and
- adjusting and setting said second exercise equipment unit in a position for use by multiple users.

12. A method according to claim 8 further comprising the steps of:
- moving said second exercise equipment unit in a swinging motion from within said second storage compartment to the fixed operational or use position in the sleeping area; and
- adjusting and setting said second exercise equipment unit in a position for use by multiple users.

13. A method according to claim 12 further comprising the steps of:
- receiving a connection of said second exercise equipment unit to a computer input;
- detecting, using a computer connected to the computer input, vital signs of multiple users;
- transmitting information of the vital signs to the computer, wherein the computer is located at remote location with respect to the second exercise equipment unit, for remote monitoring; and
- displaying the vital signs of the multiple users on the computer.

14. A method according to claim 13 further comprising the steps of:
- returning said second exercise equipment unit to said second storage compartment; and
- re-securing said second exercise equipment unit in said second storage compartment.

* * * * *